(12) United States Patent
Zhang et al.

(10) Patent No.: US 8,095,707 B2
(45) Date of Patent: Jan. 10, 2012

(54) METHOD FOR SYNCHRONIZATION OF PERIPHERALS WITH A CENTRAL PROCESSING UNIT IN AN EMBEDDED SYSTEM

(75) Inventors: Xiaoqian Zhang, Shanghai (CN); Zhiyong Guan, Shanghai (CN); Qi Li, Shanghai (CN)

(73) Assignee: Integrated Device Technology, inc., San Jose, CA (US)

( * ) Notice: Subject to any disclaimer, the term of this patent is extended or adjusted under 35 U.S.C. 154(b) by 193 days.

(21) Appl. No.: 12/194,060

(22) Filed: Aug. 19, 2008

(65) Prior Publication Data

US 2010/0049888 A1    Feb. 25, 2010

(51) Int. Cl.
*G06F 3/00* (2006.01)
*G06F 5/00* (2006.01)

(52) U.S. Cl. ............................................. 710/61
(58) Field of Classification Search ................. 710/61
See application file for complete search history.

(56) References Cited

U.S. PATENT DOCUMENTS

| | | | |
|---|---|---|---|
| 4,535,404 A * | 8/1985 | Shenk | 710/59 |
| 5,191,653 A * | 3/1993 | Banks et al. | 710/113 |
| 6,112,320 A | 8/2000 | Dien | |
| 6,212,589 B1 * | 4/2001 | Hayek et al. | 710/119 |
| 6,263,390 B1 * | 7/2001 | Alasti et al. | 710/308 |
| 6,775,732 B2 * | 8/2004 | Jahnke et al. | 710/306 |
| 2005/0218956 A1 | 10/2005 | LaBerge | |
| 2006/0080492 A1 | 4/2006 | Choi et al. | |

OTHER PUBLICATIONS

Amba: Enabling Reusable On-Chip Designs by David Flynn IEEE copyright 1997.*
PCT International Preliminary Report on Patentability mailed Mar. 3, 2011, in related International Application No. PCT/US2009/054360.

* cited by examiner

*Primary Examiner* — Henry Tsai
*Assistant Examiner* — Eric Oberly
(74) *Attorney, Agent, or Firm* — Hayes and Boone LLP (57) ABSTRACT

A method and apparatus for synchronizing I/O peripherals with a CPU in an embedded system is discussed. The method involves receiving an address from the CPU in response to a read and/or write access, translating the address received from the CPU to identify a I/O peripheral to be accessed, disabling the operation of the CPU and synchronizing a memory from the CPU clock domain to the clock domain of the identified I/O peripheral. Upon completion of the read/write access, the identified I/O peripheral sends an acknowledgment, the memory is then synchronized from the clock domain of the I/O peripheral to the CPU clock domain and the operation of the CPU is then enabled.

In another embodiment, if the acknowledgement from the identified I/O peripheral is not received within a predefined time duration, reserved data is sent to the CPU and the operation/access can be restarted.

16 Claims, 6 Drawing Sheets

METHOD FOR SYNCHRONIZATION OF PERIPHERALS WITH A CENTRAL PROCESSING UNIT IN AN EMBEDDED SYSTEM

BACKGROUND

1. Technical Field

This invention relates to embedded systems, and more specifically, the synchronization of asynchronous Input/Output (I/O) peripherals with a central processing unit within an embedded system.

2. Discussion of Related Art

An embedded system is a combination of embedded hardware, embedded software, and other electro/mechanical components that is designed to perform a specific function. Typically, an embedded system consists of a CPU, a memory, and one or more I/O peripherals. Some of the I/O peripherals might reside within the same chip as the CPU and are called internal peripherals, while others might reside outside the CPU, and are hence called external peripherals. The input peripherals are typically analog-to-digital (A/D) devices such as, for example sensors, transducers, steering mechanisms or other such devices. Output peripherals are typically D/A devices such as actuators, switches, display devices, or other such devices.

Due to various power and performance requirements, the different components of an embedded system operate in different clock domains (frequency). For example, the CPU works at higher frequency than most I/O peripherals. In order to harmonize all these different clock domain devices, data transfer should be synchronized from one clock domain to another.

Therefore, there is a need to efficiently synchronize the various asynchronous peripherals with the CPU in an embedded system.

SUMMARY

Consistent with some embodiments of the present invention, an apparatus for synchronizing peripherals in an embedded system includes an address decoder and synchronizer (ADS) coupled to a CPU for peripheral input/output (I/O) and access by CPU; at least one I/O peripheral coupled to the ADS; and a memory coupled to the ADS wherein data read from or written to the at least one I/O peripheral is stored into a designated location of the memory.

A method for synchronizing I/O peripherals with a CPU in an embedded system includes an address decoder and synchronizer (ADS) receiving an address from the CPU in response to a read and/or write access; the ADS translating the address received from the CPU to identify an I/O peripheral to be accessed; the ADS further disabling the operation of the CPU and synchronizing a memory from the CPU clock domain to the clock domain of the identified I/O peripheral; sending by the identified I/O peripheral to the ADS, an acknowledgment indicating its status; the ADS further enabling the operation of the CPU; and the ADS synchronizing, the memory from the clock domain of the identified I/O peripheral to the clock domain of the CPU.

These and other embodiments of the invention are further described below with respect to the following figures.

In the figures, elements having the same designation have the same or similar functions.

DETAILED DESCRIPTION

In the following description and claims, the terms "coupled" and "connected," along with their derivatives, may be used. It should be understood that these terms are not intended as synonyms for each other. Rather, in particular embodiments, "connected" and/or "coupled" may be used to indicate that two or more elements are in direct physical or electronic contact with each other. However, "coupled" may also mean that two or more elements are not in direct contact with each other, but yet still cooperate, communicate, and/or interact with each other.

In the following description and claims, the term "Bus" along with its derivatives, may be used. The term "Bus" is intended to encompass "data and address bus," "data bus," and "address bus" along with their derivatives. It should be understood that a bus may have separate data lines and address lines or, address and data may be sent over the same lines.

A method and apparatus for synchronizing I/O peripherals with a CPU in an embedded system is discussed. The method involves receiving an address from the CPU in response to a read and/or write access, translating the address received from the CPU to identify an I/O peripheral to be accessed, disabling the operation of the CPU and synchronizing a memory from the CPU clock domain to the clock domain of the identified I/O peripheral. Upon completion of the read/write access, the identified I/O peripheral sends an acknowledgment, the memory is then synchronized from the clock domain of the I/O peripheral to the CPU clock domain and the operation of the CPU is then enabled.

In some embodiments, if the acknowledgement from the identified I/O peripheral is not received within a predefined time duration, reserved data is sent to the CPU and the operation/access can be restarted.

Methods and techniques that are currently employed for Peripheral input and output include (1) programmed I/O; (2) direct memory address (DMA); and (3) memory-mapped I/O. Each of these methods has its own set of advantages and disadvantages.

The programmed I/O method employs special data movement instructions to transfer data to and from the CPU. For example, an IN instruction results in the transfer of data from an I/O peripheral to a specific CPU register. Similarly, an OUT instruction results in the output of data from a CPU register to a specific I/O peripheral. Typically, the programmed I/O method requires the CPU to support these special data movement instructions.

In the DMA method, the various I/O peripherals are given access to the memory without the intervention of the CPU. In other words, Information (address, data, and control) is exchanged directly between the memory and the I/O peripherals with no intervention from the CPU. A DMA controller prevents the collision of access to the memory between the various I/O peripherals and the CPU.

Figure 1:
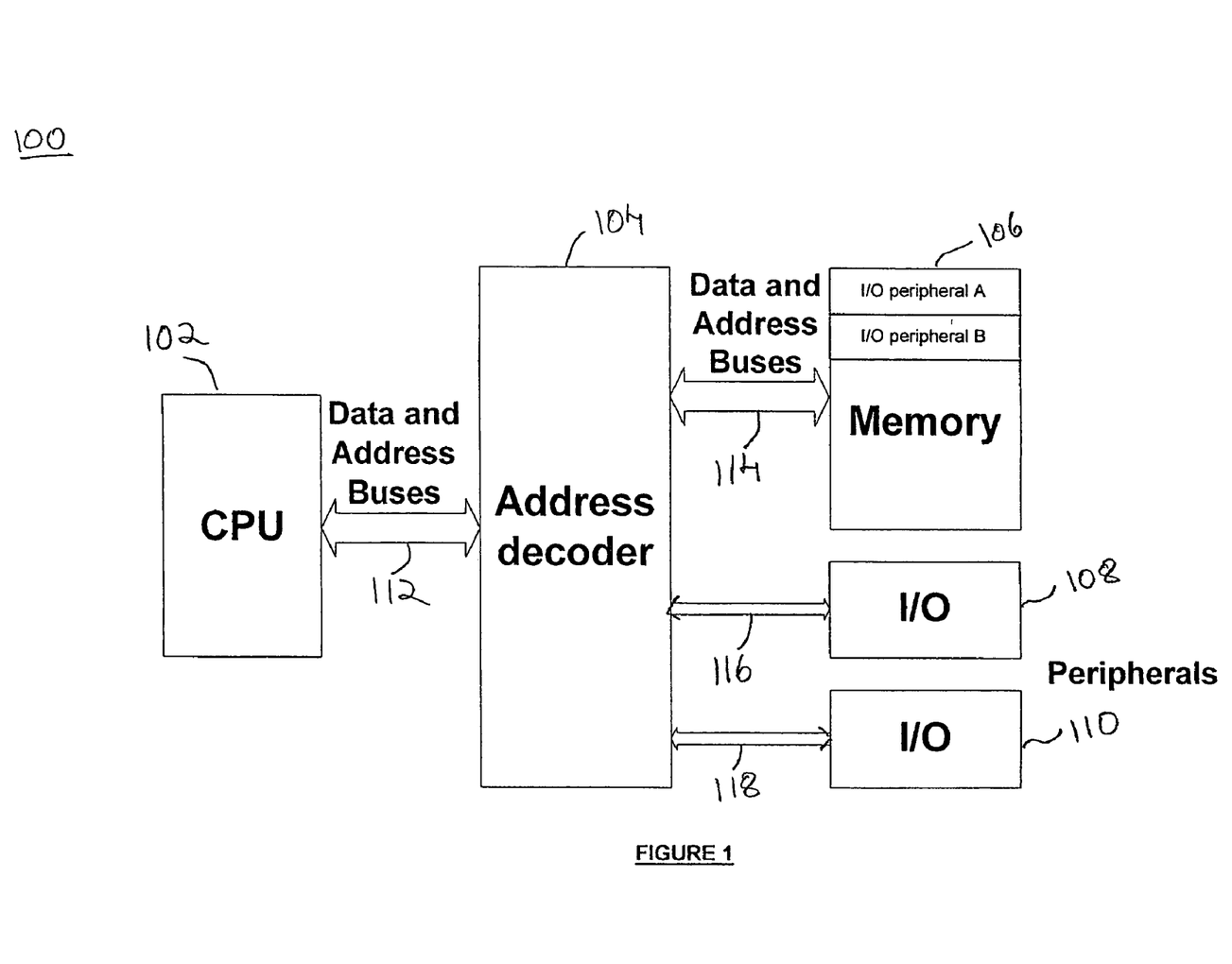
FIG. 1 illustrates a block diagram of an embedded system.

The Memory-mapped I/O method provides an efficient data transfer mechanism because it does not require the use of special CPU I/O instructions or a DMA controller. FIG. 1 illustrates a block diagram of a classical embedded system 100 that employs the memory-mapped method for Input/Output (I/O). Embedded system 100 includes a CPU 102 that is coupled to an Address decoder 104 by data and address bus 112. Address decoder 104 is further coupled to a Memory 106 and I/O peripherals 108 and 110 via data and address buses 114, 116, and 118, respectively. As can been seen in FIG. 1, the memory-mapped method designates specific locations of memory to each of the I/O peripherals such that the designated memory locations appear as virtual I/O ports. Information to and/or from the CPU and the I/O peripherals is exchanged via these designated memory locations.

Figure 2:
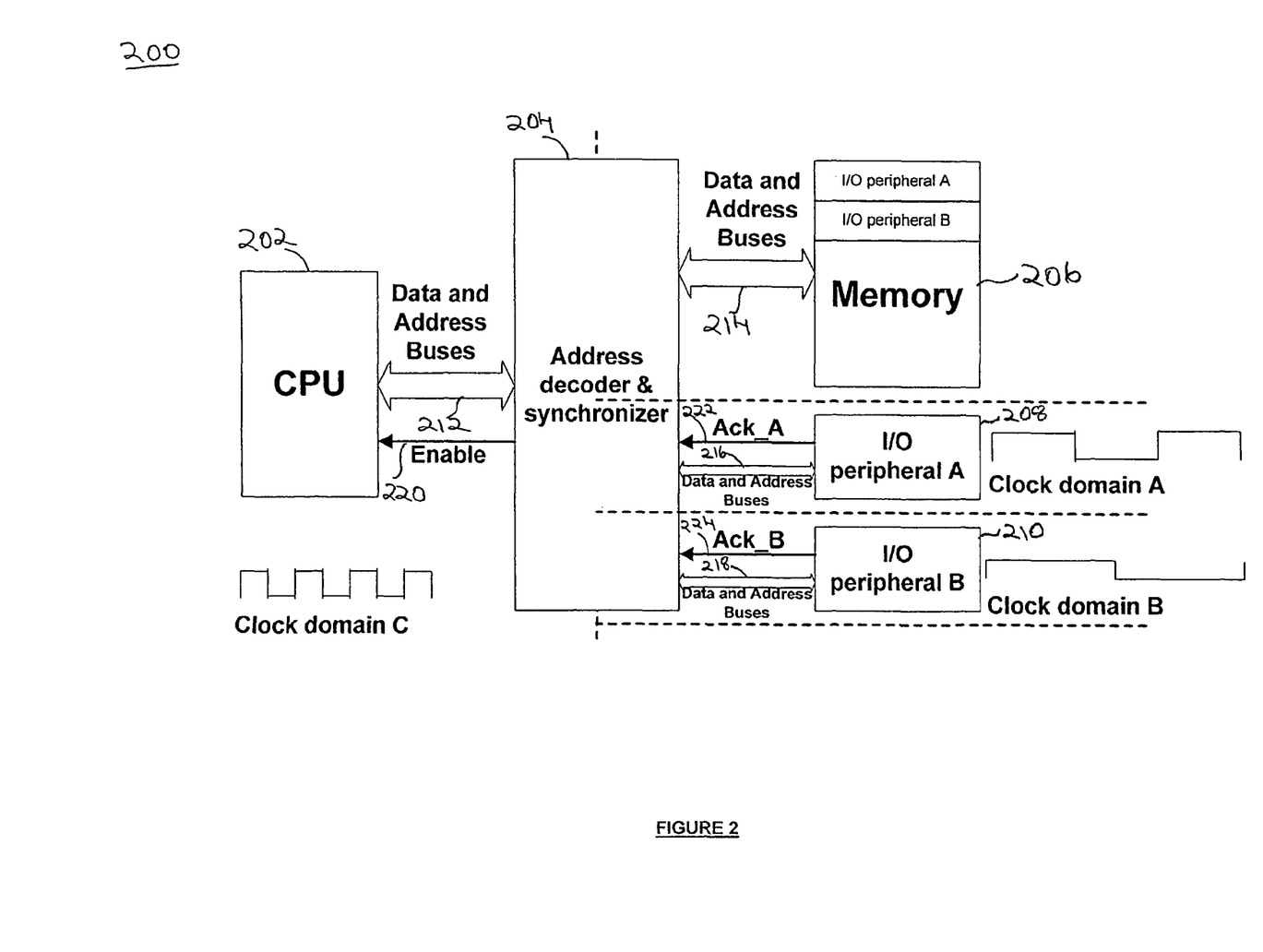
FIG. 2 illustrates a block diagram of another embedded system consistent with some embodiments of the present invention.

FIG. 2 illustrates a block diagram of an embedded system 200 that employs the memory-mapped method for Input/Output (I/O) consistent with the present invention. Embedded system 200 includes a CPU 202 that is coupled to an Address decoder and synchronizer (ADS) 204 by bus 212. ADS 204 is further coupled to a Memory 206 by bus 214, and I/O peripherals 208 and 210 by buses 216 and 218 respectively. CPU 202 has a controlling input line 220 that is coupled with ADS 204 to disable (halt) and/or enable (resume) the operation of CPU 202. I/O peripherals 208 and 210 have output terminals 222 and 224 coupled with ADS 204 to provide an acknowledgement signal (Ack_A/Ack_B) to indicate its status. The status of an I/O peripheral can include information indicative of the completion of an operation and/or access.

For convenience, a system with two I/O devices, I/O peripheral 208 and I/O peripheral 210, is illustrated in FIG. 2. However, there may be any number of I/O devices included in embedded system 200. Therefore, the present disclosure is not limited in the number of I/O devices that may be included and supported by an embedded system that is consistent with the present invention.

As mentioned earlier, in some embodiments, CPU 202 and I/O peripherals 208 and 210 may work in different clock domains. As shown in FIG. 2, CPU 202, I/O peripheral A 208 and I/O peripheral B 210 are assumed to be working in clock domains C, A, and B, respectively. ADS 204 is capable of working in clock domains A, B, and C. ADS 204 performs synchronization from the CPU clock domain to the clock domain of a desired I/O peripheral by synchronizing Memory 206 from the CPU clock domain to the clock domain of the desired I/O peripheral. This enables the desired I/O peripheral to access memory 206. Similarly, ADS 204 performs synchronization from the I/O peripheral clock domain to the CPU clock domain by synchronizing Memory 206 from the I/O peripheral clock domain to the CPU clock domain and thus enabling CPU 202 to access memory 206.

During a read access (i.e., an operation where CPU 202 reads data from one of the I/O peripherals), ADS 204 receives an address from CPU 202 on bus 212. ADS 204 translates the address to identify the I/O peripheral CPU 202 is trying to access. As an example, if CPU 202 is reading data from peripheral A 208, ADS 204 first receives an address associated with peripheral A 208 from CPU 202. ADS 204 then disables the operation of CPU 202 utilizing control input line 220. ADS 204 then synchronizes information (Address, data, and control) received from CPU 202 from clock domain C, the clock of CPU 202, to the clock domain of the identified peripheral, in this case clock domain A. Data is then transferred from I/O Peripheral A 208 to the designated memory location 220 of I/O Peripheral A 208 in memory 206 on bus 216 utilizing clock domain A. If I/O Peripheral B 210 is addressed by CPU 202, then ADS 204 transfers data from I/O Peripheral B 210 on bus 218 to the designated memory location 222 in memory 206 utilizing clock domain B.

After data from I/O peripheral A 208 is written into designated memory 220, I/O peripheral 208 sends an acknowledgement signal (Ack_A) by output terminal 222 to ADS 204 indicating that status. Upon receiving the acknowledgement signal, ADS 204 then enables CPU 202 and synchronizes data stored in designated memory 220, which was received from peripheral 208 on bus 216. In other words, data from designated memory 220 is transferred to CPU 202 utilizing clock domain C. As shown in FIG. 2, CPU 202 reads the data from I/O peripheral A on bus 212.

During a write access, a similar procedure is performed with the exception that the direction of the data transfer is reversed. Data to be transmitted to I/O peripheral A 208, for example, is written into designated memory 220 from CPU 202 utilizing clock domain C. Then, ADS 204 disables CPU 202 and transfers data from designated memory 220 to I/O Peripheral A utilizing clock domain A.

Figure 3A:
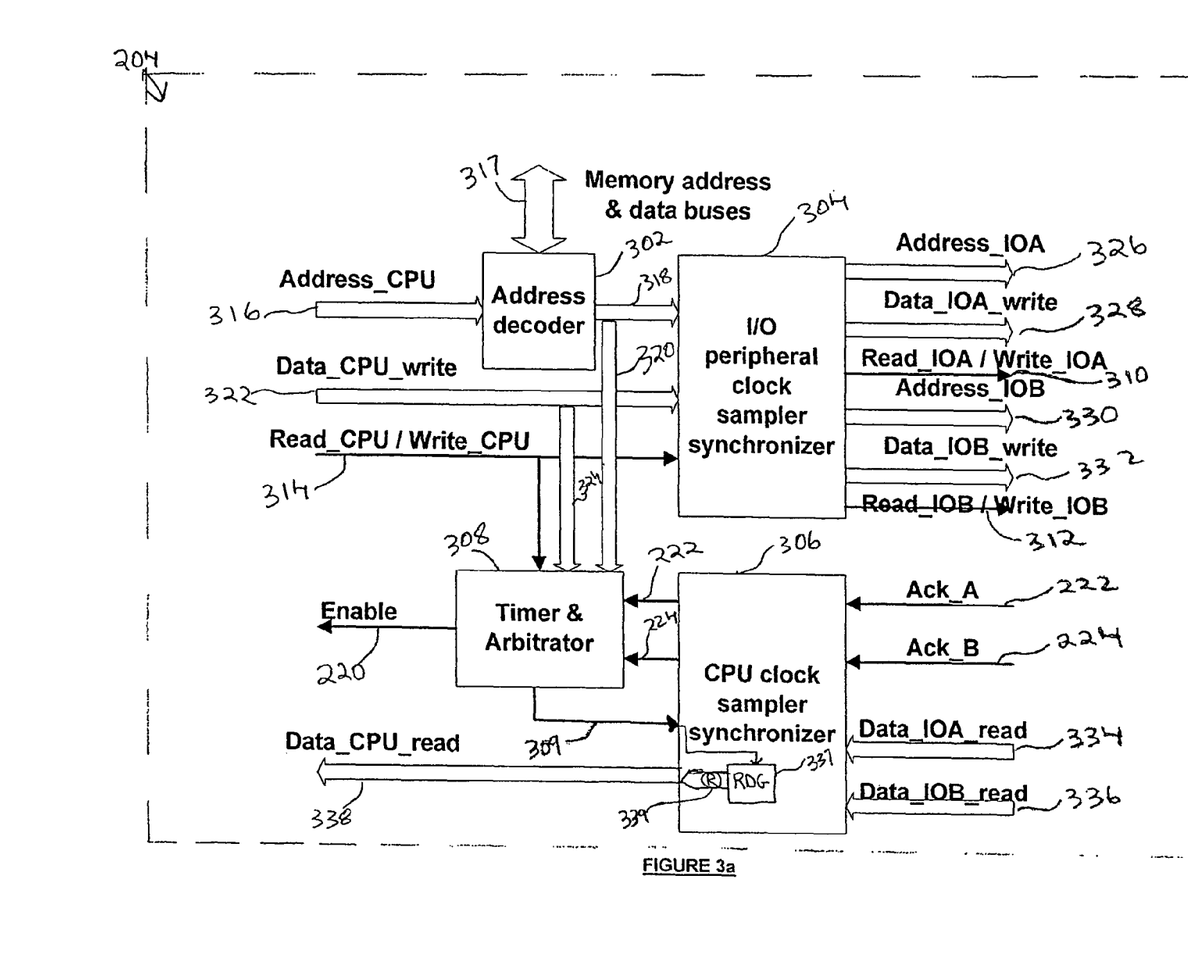
FIG. 3a illustrates a block diagram of an apparatus used to synchronize peripherals in an embedded system consistent with some embodiments of the present invention.

FIG. 3a illustrates a block diagram of ADS 204 consistent with some embodiments of the present invention. ADS 204 includes an Address decoder 302 that is coupled with CPU 202 (not shown in FIG. 3a) by bus 316 to receive as an input signal address(es) from CPU 202. Address decoder 302 is coupled with the I/O peripheral clock sampler synchronizer (PCSS) 304 and Timer and Arbitrator (TA) 308 using buses 318 and 320, respectively, to provide as an output signal the translated address(es). Address decoder 302 is further coupled with Memory 206 (not shown in the figure) by bus 317.

As shown in FIG. 3a, I/O peripheral clock sampler synchronizer (PCSS) 304 is coupled with CPU 202 (not shown in figure) by bus 320 to receive as an input signal data from CPU 202. PCSS 304 is also coupled with CPU 202 (not shown in FIG. 3a) by input line 314 to receive a control signal indicating the type of access (read and/or write) to be performed. PCSS 304 is coupled with I/O peripheral 208 (not shown in FIG. 3a) by output line 310 to provide a control signal indicating the type of access (read and/or write) to be performed. In addition, PCSS 204 also has buses 326 and 328 coupled with peripheral 208 to provide as output signals, address and data respectively. Similarly, PCSS 204 is coupled with peripheral 210 by output line 312, buses 330 and 332 to provide a control signal indicating the type of access, an address, and data respectively.

As shown in FIG. 3a, ADS 204 further includes a CPU clock sampler synchronizer (CCSS) 306. CCSS 306 is coupled with peripheral 208 (not shown in FIG. 3a) by terminal 222 to receive, upon completion of a read and/or write operation, an acknowledgement signal (Ack_A) from peripheral 208. CCSS 306 is also coupled with peripheral 208 by bus 334 to receive as an input signal, data from peripheral 208. Similarly, CCSS 306 is coupled with peripheral 210 (not shown in figure) to receive an acknowledgment signal (Ack_B) and data from peripheral 210 by input terminal 224 and bus 336 respectively. In some embodiments, CCSS 306 can include an input line 309 coupled to a Timer and arbitrator (TA) 308 to receive a timeout signal.

CCSS 306 is further coupled with CPU 202 by bus 338 to provide data to CPU 202. In addition, CCSS 306 provides acknowledgments received from input terminals 222 and 224 to TA 308 through terminals 222 and 224. In some embodiments, CCSS 306 includes a reserved data generator (RDG) 337 coupled with input line 309 to receive the timeout signal and generate reserved data (R) 339 in response to the timeout signal. CPU 202 can receive the reserved data (R) 339 on bus 338. The reserved data (R) 339 indicates to CPU 202 the occurrence of a timeout due to no acknowledgement from I/O peripherals 208 or 210.

TA 308 is coupled with input line 314 to receive a control signal indicative of the type of access being performed. TA 308 is further coupled with CPU 202 by control input line 220 to provide an enable signal to CPU 202 that can enable certain operations of CPU 202.

During a read access, PCSS 304 receives by input line 314 a signal indicating that CPU 202 is performing a read access. Address decoder 302 receives an address from CPU 202 on bus 316. Address decoder 302 translates the address to identify the I/O peripheral that CPU 202 is trying to access. Assuming that CPU 202 is trying to access I/O peripheral A 208, PCSS 304 and TA 308 receive the translated address from address decoder 302 on buses 318 and 320, respectively. TA 308 disables the operation of the CPU by asserting the enable signal on control line 220 and PCSS 304 synchronizes data, address, and control information received on buses 318, 322 and 314 respectively from clock domain C to clock domain A. PCSS 304 sends a signal (Read_IOA) to peripheral A 208 by output line 310 to indicate to peripheral 208 that CPU 202 is trying to perform a read access. After the data from Peripheral 208 is ready to be read, peripheral 208 sends an acknowledgement signal (Ack_A) by input terminal 222 to CCSS 306 indicating its status. CCSS 306 synchronizes data received from peripheral 208 on bus 334, from clock domain A to clock domain C and forwards acknowledgement signal (Ack_A) received by input terminal 222 to TA 308. TA 308 enables the operation of CPU 202 by control input line 220 and CPU 202 reads the data from peripheral 208 on bus 338. During a write access, a similar method is performed with the exception that the direction of the data transfer is reversed.

Figure 3B:
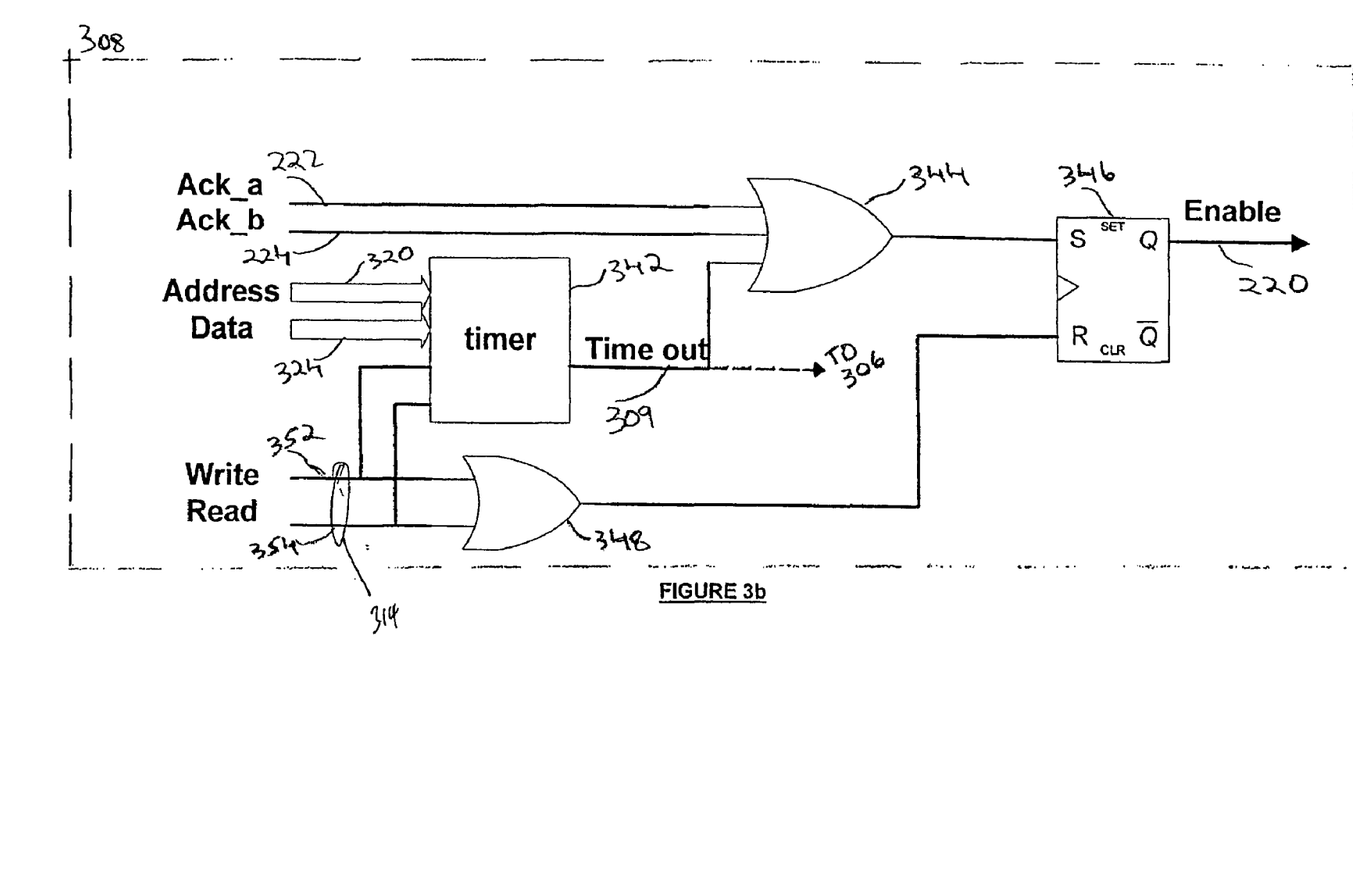
FIG. 3b illustrates a schematic diagram of a sub-apparatus discussed in FIG. 3a, consistent with some embodiments of the present invention.

FIG. 3b illustrates a schematic diagram of TA 308. TA 308 includes a 3-input OR gate 344 that has two of its inputs coupled with terminals 222 and 224 to receive acknowledgement signals Ack_A and Ack_B. The third input of gate 344 is coupled to line 309 of a timer 342 to receive a signal indicating a timeout. The output signal from Gate 344 is coupled to the S input of a RS latch 346. Timer 342 is coupled with Address decoder 302 by bus 320 to receive the translated address as an input signal. Timer 342 is coupled to bus 324 to receive data from CPU 202 as an input signal. In addition, timer 342 is also coupled with CPU 202 by input line 314 to receive a control signal indicating the type of access being performed. In some embodiments, input line 314 can collectively include two separate lines 352 and 354 to indicate a write access and read access, respectively. Timer 342 is coupled to gate 344 and CCSS 306 by line 309 to provide a timeout signal as an output. In some embodiments, various criteria (such as time duration) for generating a timeout signal can be configured by a user via program code. As shown in FIG. 3b, lines 352 and 354 are coupled to a 2-Input OR gate 348 and the output signal of gate 348 is coupled with the R-input of latch 346. Latch 348 is further coupled to CPU 202 by control input line 220. In some embodiments, gate 344, gate 348 and latch 346 can be collectively known as an enable generation circuit (EGC).

During a read or write access, if an acknowledgement signal is not received from an I/O peripheral within the predefined criteria, the timer 342 asserts a timeout signal by line 309. CCSS 306 sends reserved data (R) to CPU 202. CPU 202 identifies reserved data (R) and restarts the read or write access. In some embodiments, CPU 202 can be configured to perform alternative operations upon receiving reserved data (R).

Figure 4A:
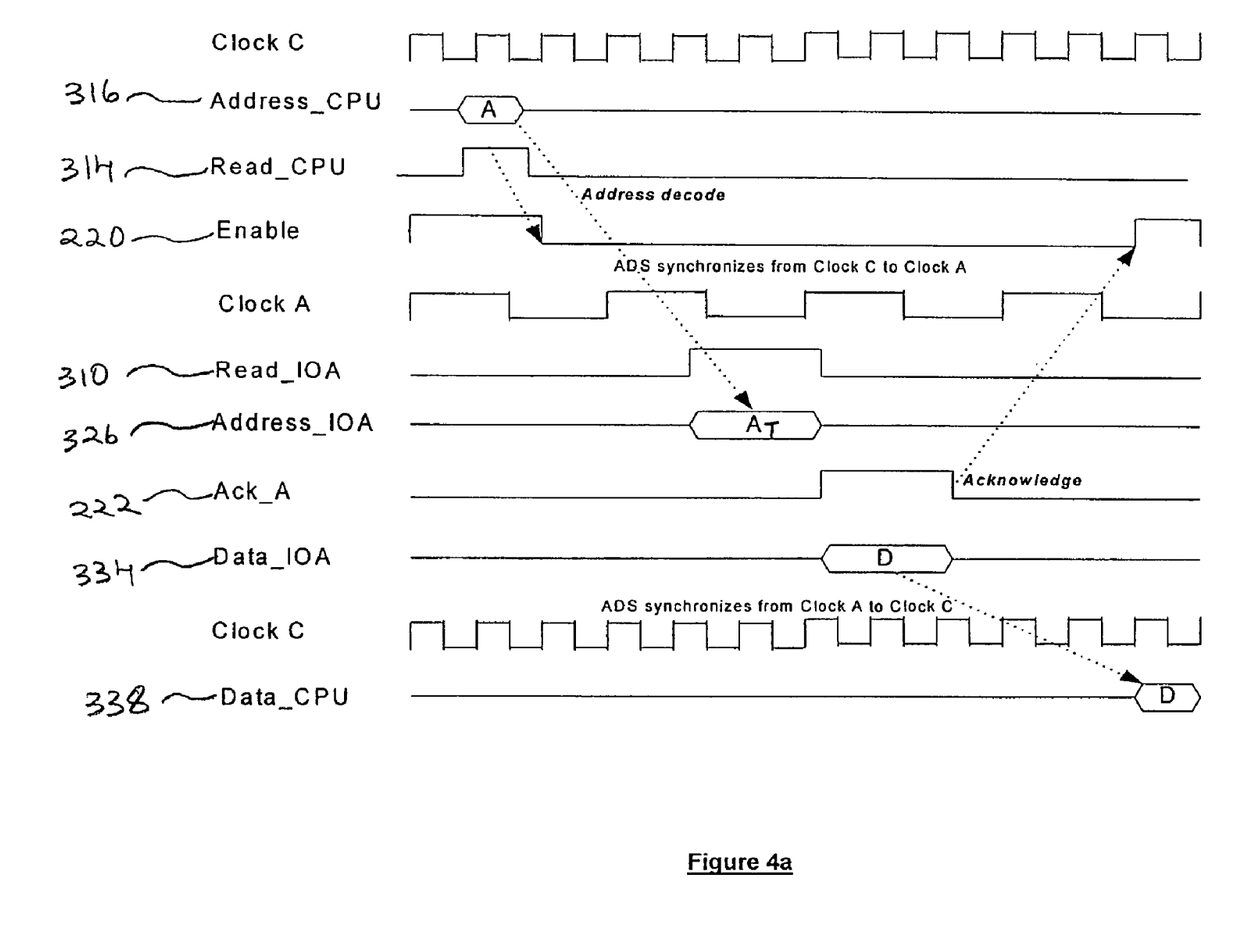
FIG. 4a illustrates a signal timing diagram of an embedded system during a read access, consistent with some embodiments of the present invention.

FIG. 4a illustrates an exemplary signal timing diagram of a read access on peripheral 208 (as discussed earlier). During the read access by CPU 202 (running in clock domain C), ADS 204 decodes address information (A) 402 received from CPU 202 on bus 316 and translates address (A) 402 to obtain translated address (AT) 403 to identify the I/O peripheral that CPU 202 is trying to access. In some embodiments, address (A) 402 and address ($A_T$) 403 can be in the same format.

Assuming, the accessed address indicates peripheral 208, in the next clock cycle, ADS 204 disables the operation of CPU 202 by control input line 220, while simultaneously synchronizing address information ($A_T$) 403 from clock domain C to clock domain A. ADS 204 then asserts control signal (Read_IOA) by output line 310 to indicate to peripheral 208 to read address information ($A_T$) 403. Peripheral 208 reads address information ($A_T$) 403 on bus 326 and sends acknowledgement signal (Ack_A) on terminal 222 to ADS 204. Peripheral 208 also sends data information (D) 404 to ADS 204 on bus 334. ADS 204 synchronizes data information (D) 404 from clock domain A to clock domain C and further enables the operation of CPU 202 by control input line 220 in the next clock cycle. CPU 202 then reads data information (D) 404 on bus 338.

Figure 4B:
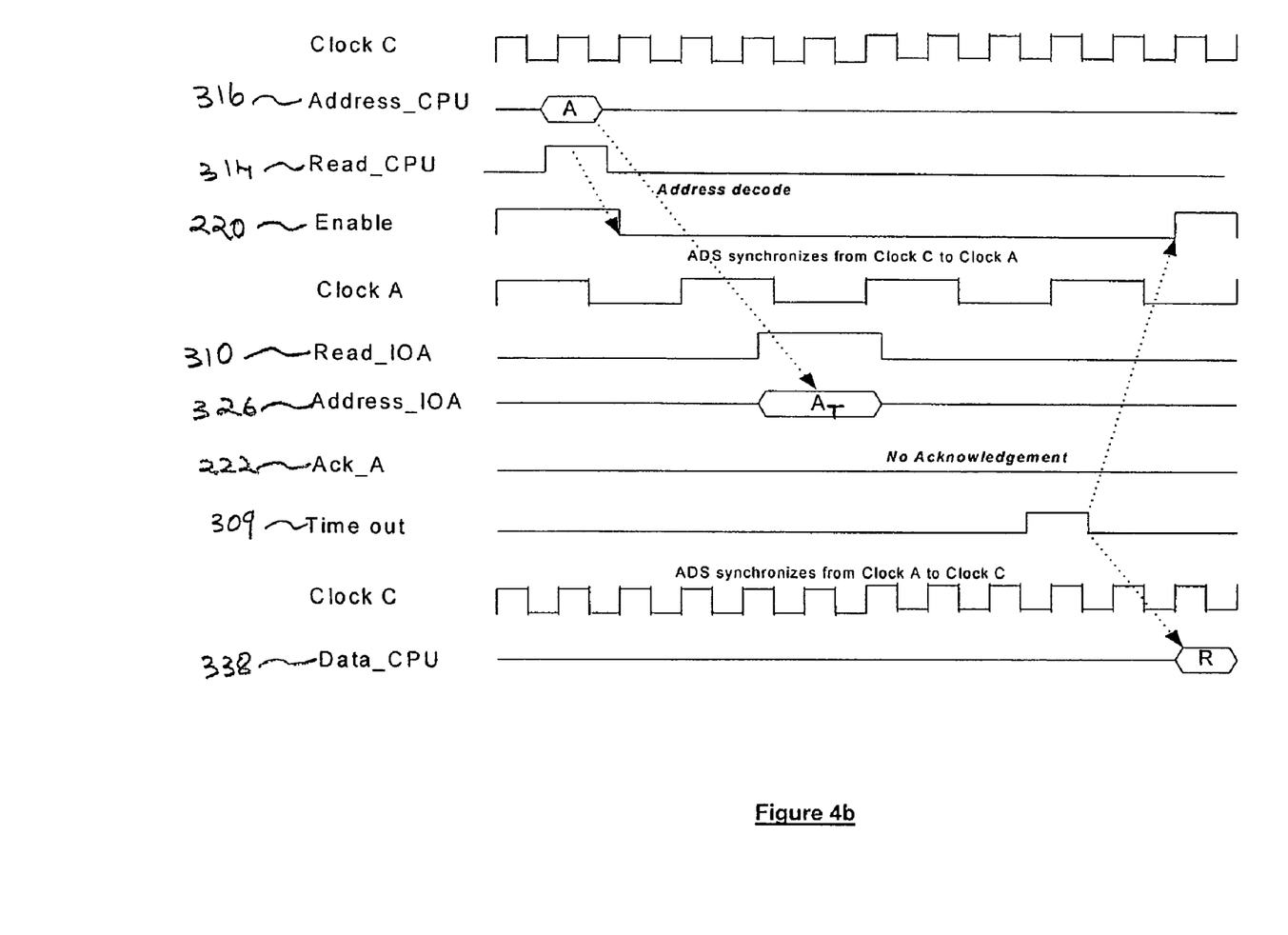
FIG. 4b illustrates another signal timing diagram of an embedded system during a read access, consistent with some embodiments of the present invention.

FIG. 4b illustrates an exemplary signal timing diagram of a read access on peripheral 208 (as discussed earlier) when a timeout has been asserted. During the read access by CPU 202 (running in clock domain C), ADS 204 decodes address information (A) 402 received from CPU 202 on bus 316 and translates address (A) 402 to obtain translated address ($A_T$) 403 to identify the I/O peripheral that CPU 202 is trying to access. In some embodiments, address (A) 402 and address ($A_T$) 403 can be in the same format.

Assuming, the accessed address is for peripheral 208, in the next clock cycle, ADS 204 disables the operation of CPU 202 by asserting the enable signal on control input line 220, while simultaneously synchronizing address information ($A_T$) 403 from clock domain C to clock domain A. ADS 204 then asserts control signal (Read_IOA) on output line 310 to indicate to peripheral 208 to read address information ($A_T$) 403. Peripheral 208 reads address information ($A_T$) 403 from bus 326 and sends acknowledgement signal (Ack_A) on terminal 222 to ADS 204. If ADS 204 does not receive acknowledgement signal (Ack_A) within the predefined timeout criteria, the timeout signal is asserted. RDG 337 generates reserved data (R) 339 and CCSS 306 synchronizes reserved data information (R) 339 from clock domain A to clock domain C and further enables the operation of CPU 202 by control input line 220 in the next clock cycle. CPU 202 then reads reserved data (R) 404 on bus 338. CPU 202 identifies the reserved data (R) 339 and restarts the read access.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for synchronizing peripherals in an embedded system comprising:
   a central processing unit (CPU);
   at least one input/output (I/O) peripheral;
   an address decoder and synchronizer(ADS) coupled to the CPU and the at least one input/output (I/O) peripheral wherein the ADS comprises:
   (a) an address decoder coupled to receive an address from the CPU and provide a translated address identifying one of the at least one I/O peripheral to be accessed;
   (b) an I/O peripheral clock sampler synchronizer (PCSS) coupled to receive the translated address, data, and control information from the CPU;
   (c) a CPU clock sampler synchronizer (CCSS) coupled to receive data and the acknowledgement from the at least one I/O peripheral; and
   (d) a timer and arbitrator (TA) circuit coupled to the CPU, the CCSS, and the address decoder, the TA circuit receiving: acknowledgement signals from the CCSS in response to receiving the acknowledgement from at least one I/O peripheral; the translated address from the address decoder; and data and control information from the CPU, wherein the TA circuit comprises:
      a timer coupled to the CPU and the address decoder, the timer generating a timeout signal after a predefined time duration; and
      an Enable Generation Circuit (EGC) coupled to the timer, the CPU, and the CCSS, the EGC enabling and/or disabling the operation of the CPU in response to the acknowledgement from the CCSS or the timeout signal from the timer; and
   a memory coupled to the ADS, wherein data read from or written to the at least one I/O peripheral is stored into a designated location of the memory in a clock domain of the at least one I/O peripheral.

2. The apparatus of claim 1, wherein the at least one I/O peripheral provides an acknowledgement to the ADS indicative of the status of the at least one I/O peripheral.

3. The apparatus of claim 1, wherein:
   the PCSS synchronizes the translated address, data and control information from the CPU clock domain to the clock domain of the one of the at least one I/O peripheral corresponding to the translated address;
   the CCSS synchronizes received data and the acknowledgement from the clock domain of the one of the at least one I/O peripheral corresponding to the translated address to the CPU clock domain; and
   the timer generates the timeout signal due to lack of the acknowledgement from the one of the at least one I/O peripheral corresponding to the translated address within a predefined time interval, and the TA further enabling and/or disabling the operation of the CPU by generating an enable signal in response to the timeout signal or the acknowledgement from the one of the at least one I/O peripheral corresponding to the translated address.

4. The apparatus of claim 3, wherein:
   the timer receives the translated address from the address decoder and the data and control information from the CPU; and
   the Enable Generation Circuit (EGC) receives the timeout signal from the timer, the acknowledgement from the CCSS in response from the acknowledgement from at least one I/O peripheral, and control information from the CPU.

5. The apparatus of claim 3, wherein the CCSS further comprises a reserved data generator coupled to receive the timeout signal, the reserved data generator sending reserved data to the CPU in response to the timeout signal.

6. The apparatus of claim 5 wherein the reserved data is data indicative of the occurrence of a timeout due to lack of the acknowledgement from the one of the at least one I/O peripheral.

7. The apparatus of claim 3, wherein the CPU further includes a control input coupled with the ADS to receive the enable signal and enable and/or disable the operation of the CPU in response to the enable signal.

8. A method for synchronizing input/output (I/O) peripherals with a central processing unit (CPU) in an embedded system comprising:
   receiving, at an address decoder and synchronizer (ADS) coupled to the CPU, information from the CPU in response to a read and/or write access, the information including an address, data, and control information;
   translating, by an address decoder of the ADS, the address received from the CPU to identify an I/O peripheral to be accessed;
   disabling, by an Enable Generation Circuit (EGC) of a timer and arbitrator (TA) circuit of the ADS, the operation of the CPU;
   synchronizing, by an I/O peripheral clock sampler synchronizer (PCSS) of the ADS, the information received from the CPU from a clock domain of the CPU to a clock domain of the identified I/O peripheral;
   transferring, from the identified I/O peripheral to a designated memory location in a memory coupled to the ADS, data, the data being transferred in the clock domain of the identified I/O peripheral;
   sending, by the identified I/O peripheral to the ADS, an acknowledgment indicating its status;
   enabling, by the EGC of the ADS, the operation of the CPU; and
   synchronizing, by a CPU clock sample synchronizer (CCSS) of the ADS, the data stored in the designated memory location of the memory from the clock domain of the identified I/O peripheral to the clock domain of the CPU.

9. The method of claim 8 further comprising:
   generating, by the timer of the TA circuit of the ADS, a timeout signal if the acknowledgment from the identified I/O peripheral is not received within a predefined time duration.

10. The method of claim 9 wherein a length of the time duration and criteria for generating the timeout signal can be configured by program code.

11. The method of claim 8 further compromising:
    sending, by the CCSS of the ADS, reserved data to the CPU in response to the timeout signal, wherein the reserved data contains data indicative of the occurrence of a timeout.

12. An apparatus for synchronizing peripherals in an embedded system comprising:
    a central processing unit (CPU);
    at least one input/output (I/O) peripheral;

an address decoder and synchronizer(ADS) coupled to the CPU and the at least one input/output (I/O) peripheral wherein the ADS comprises:
  (a) an address decoder coupled to receive an address from the CPU and provide a translated address identifying one of the at least one I/O peripheral to be accessed;
  (b) an I/O peripheral clock sampler synchronizer (PCSS) coupled to receive the translated address, data, and control information from the CPU;
  (c) a CPU clock sampler synchronizer (CCSS) coupled to receive data and the acknowledgement from the at least one I/O peripheral; and
  (d) a timer and arbitrator (TA) circuit coupled to the CPU, the CCSS, and the address decoder, the TA circuit receiving: acknowledgement signals from the CCSS in response to receiving the acknowledgement from at least one I/O peripheral; the translated address from the address decoder; and data and control information from the CPU, the TA circuit comprising:
    a timer coupled to the CPU and the address decoder, and receiving the translated address from the address decoder and the data and control information from the CPU, the timer generating a timeout signal after a predefine time duration; and
    an Enable Generation Circuit (EGC) coupled to the timer, the CPU, and the CCSS, the EGC receiving the timeout signal from the timer, the acknowledgement from the CCSS in response from the acknowledgement from at least one I/O peripheral, and control information from the CPU, the EGC enabling and/or disabling the operation of the CPU in response to the acknowledgement from the CCSS corresponding to the translated address or the timeout signal from the timer; and
a memory coupled to the ADS, wherein data read from or written to the at least one I/O peripheral is stored into a designated location of the memory in a clock domain of the at least one I/O peripheral, wherein:
  the PCSS synchronizes the translated address, data and control information from the CPU clock domain to the clock domain of the one of the at least one I/O peripheral corresponding to the translated address;
  the CCSS synchronizes received data and the acknowledgement from the clock domain of the one of the at least one I/O peripheral corresponding to the translated address to the CPU clock domain; and
  the TA generates a timeout signal due to lack of the acknowledgement from the one of the at least one I/O peripheral corresponding to the translated address within a predefined time interval, and the TA further enabling and/or disabling the operation of the CPU by generating an enable signal in response to the timeout signal or the acknowledgement from the one of the at least one I/O peripheral corresponding to the translated address.

13. The apparatus of claim 12, wherein the at least one I/O peripheral provides an acknowledgement to the ADS indicative of the status of the at least one I/O peripheral.

14. The apparatus of claim 12, wherein the CCSS further comprises a reserved data generator coupled to receive the timeout signal, the reserved data generator sending reserved data to the CPU in response to the timeout signal.

15. The apparatus of claim 14, wherein the reserved data is data indicative of the occurrence of a timeout due to lack of the acknowledgement from the one of the at least one I/O peripheral.

16. The apparatus of claim 12, wherein the CPU further includes a control input coupled with the ADS to receive the enable signal and enable and/or disable the operation of the CPU in response to the enable signal.

* * * * *